United States Patent Office
3,114,722
Patented Dec. 17, 1963

1

3,114,722
PREPARATION OF A COMPOSITION CONTAINING EXPANDED POLYMERIC MATERIALS
Stanley C. Einhorn, Dover, and Leroy J. Memering, Franklin, N.J., assignors, by mesne assignments, to Stauffer-Hewitt, Inc., Franklin, N.J., a corporation of Delaware
No Drawing. Filed Aug. 7, 1958, Ser. No. 753,602
6 Claims. (Cl. 260—2.5)

This invention relates to a method of preparing a composition including cellular expanded polymeric materials, particularly waste materials or scrap to reclaim and convert the same into useful products and of molding the composition.

Briefly, cellular expanded polymeric material, also referred to as foam, is bonded by means of a bonding agent comprising a urethane polymer, sometimes designated polyurethane. The cellular expanded material, or foam, in shredded form, is mixed with an aqueous catalyst-containing mixture, the catalyst being one that influences the reaction between water and free isocyanato groups, and the resulting mixture is mixed with a polyisocyanate prepolymer, as bonding agent, to form a composition which is heated for several minutes at a suitable temperature to effect the bonding. During heating, the prepolymer forms a continuous foam between the shredded particles, bonding them to form a single, integral mass. The resulting product is a foamed urethane polymer having as its major portion the shredded material incorporated therein and bonded thereto.

The product exhibits desirable mechanical properties and is useful in the same way as other foams. As more than half of the product may comprise waste or scrap foam, substantial economies are thus provided. Also, the thickness of the product is not limited, as by any requirement for drying it. It is only necessary to heat the shredded material-catalyst-prepolymer composition to effect the foaming. As a matter of fact, foaming will occur even at room temperature, although at a very slow rate, but when the composition is heated, the rate of foaming is much more rapid, and since the reaction of water and isocyanate is exothermic, the temperature of the internal portions of the material being foamed increases much more rapidly than is due to heating alone. This enables thicker cross sections to be made rapidly. No drying is involved because the water originally present in the composition comprises a very minor amount, at least a portion of which reacts, and thus none needs to be removed.

Considering the method in more detail, it comprises adding to a major amount of shredded foam material a minor amount of water-catalyst mixture. The shredded foam material, comprising particles having a particle size of $\frac{1}{16}$ to 1 inch, absorb the water-catalyst mixture. As indicated, the catalyst influences the reaction between water and a material containing free isocyanato groups to form a foamed urethane polymer. The prepolymer material is then mixed with the shredded material-water-catalyst mixture to form the said foamable composition. The prepolymer material comprises a liquid prepolymer formed by reacting a polyfunctional reactive hydrogen compound with an organic polyisocyanate, the polyfunctional compound being terminated by reactive hydrogen-containing groups which react with isocyanato groups. In the foamable composition the prepolymer forms a coating around at least a major portion of the particles of shredded material. The water and catalyst content of the composition, owing to the absorption thereof by the shredded material, is held unavailable to react at any appreciable rate at room temperatures with the prepolymer. The composition is placed in a suitable container, mold, or other space to be filled in order to permit the catalyst-influenced reaction to take place, and heat is applied to hasten the reaction. At its conclusion there is produced a foamed urethane polymer having as its major component the shredded material incorporated therein and bonded thereto.

The method is particularly applicable to the bonding of flexible polyurethane foams and flexible foam rubbers. Foam rubbers, or latex foams, may be natural or synthetic, or a mixture of the two prepared by mixing them either before or after foaming. The term latex foam is intended to include 100% natural rubber, 100% synthetic, and/or any blends thereof. A particularly suitable synthetic latex foam is butadiene-styrene latex. Another suitable foam is blown polyvinyl chloride foam. The foam to be bonded may have open cells or closed cells, except that in the latter case only those foams are suitable to which the bonding agent will adhere, that is, foams which do not act as mold release agents for the bonding agent. Such release materials include polyethylene, polyvinyl acetate, polytetrafluoroethylene, and most fluorocarbon high polymers. It will be understood that when these release materials are open celled, they are suitable for bonding. As is known, in open cell foam the cells are continuous, or connected with one another, and in closed cell foam the cells, or at least the majority of them, are not connected with one another, so that they are not water absorbent like the open or continuous cell foam. In general, any open-celled foam can be bonded, and any closed cell foam to which urethane polymers will adhere. More generally, the invention is also applicable to rigid and semi-rigid foams, but flexible foams are preferred.

The prepolymer material comprises 10 to 60 parts by weight of the product, herein designated the liquid prepolymer, formed by reacting a polyfunctional reactive hydrogen compound with an organic polyisocyanate. The liquid prepolymer product has free isocyanato end groups; preferably it has a free isocyanato content of 1 to 15% by weight. In regard to the reaction components, the polyfunctional compound is terminated by reactive hydrogen-containing groups which react with isocyanato groups; and the polyisocyanate is used in an amount sufficient to react with the polyfunctional compound. Preferably the polyisocyanate is present in an amount to provide at least 1.05 isocyanato groups per each terminal group of the polyfunctional compound. The polyisocyanate addition may be done in one or more steps. The reaction temperature may be from 20° C. to 155° C.; as indicated, the reaction may be allowed to proceed at room temperature at a reduced rate. Although the reaction components are known, some brief description of them may be in order.

Polyfunctional reactive hydrogen compounds capable of forming polyurethanes are characterized by having free reactive hydrogen-containing groups such as amino, hydroxy, mercapto (or thiohydroxy), or carboxy, which will react with isocyanate. The compounds may include polyesters, polyesteramides, and polyols. By a "polyol" is meant an aliphatic compound having two or more hydroxyl groups; as may be apparent, such definition is intended to include alkylene glycols and polyethers such as polyoxyethylene glycols, polyoxypropylene glycols, and polyoxyalkylene glycols. Polythioethers are suitable. In general, any organic compound containing at least two reactive hydrogen-containing radicals may be employed.

Polyester derivatives include those obtained by condensing any polybasic, preferably dibasic, carboxylic organic acid with a glycol. Illustrative acids are adipic, sebacic, 6-amino-caproic, phthalic, isophthalic, terephthalic, oxalic, malonic, succinic, maleic, cyclohexane-1,2- dicarboxylic, cyclohexane-1,4-dicarboxylic, polyacrylic, naphthalene-1,2-dicarboxylic, fumaric, itaconic, etc. Suitable glycols include ethylene glycol; propane-diol-1,2; propanediol-1,3; butanediol-1,2; butanediol-2,3; butanediol-1,3; butanediol-1,4; methyl-propanediol; pentanediol-1,5; pentanediol-2,3; pentanediol-1,4; pentanediol-1,2; the methylbutanediols having the hydroxy groups in the 1,2, and 2,3, and the 1,3 position; 2-methyl-pentanediol-2,4; hexanediol-2,5; heptanediol-1,7; heptanediol-2,4; 2-ethylhexanediol-1,3, etc. Also diethylene glycol; triethylene glycol; tetraethylene glycol; pentaglycol; glycerol; sorbitol; triethanolamine; and di-(beta-hydroxyethyl) ether. The acid may also be condensed with amino-alcohols such as ethanolamine; di-and triethanolamines; 3-amino-propanol; 4-amino-propanol; 5-aminopentanol-1; 6-aminohexanol; 10-aminodecanol; 6-amino-5-methylhexanol-1; p-hydroxymethyl-benzylamine, etc. Polyesteramides may be obtained by condensing the acid with amines like ethylene diamine; hexamethylene diamine; 3-methylhexamethylene diamine; decamethylene diamine; m-phenylenediamine; etc. The acid may be condensed with a mixture of the foregoing glycols, and/or amino-alcohols and/or amines to produce other suitable polyfunctional compounds. In the esterification, the acid per se may be used for condensation or, where desirable, equivalent components, such as the acid halide or anhydride may be used.

Molecular weights of the polyesters and polyesteramides may range from 600 to 5000, but usually are not over 2500 and preferably are in the range of 600 or 700 to 2000 or 2200. The materials may have 2 to 10 reactive end groups per molecule. They should be normally liquid materials, that is, liquid at room temperatures, but normally solid materials are suitable if they have a melting point below about 35° C.

The polyoxyethylene glycols, polyoxypropylene glycols, and polyoxyalkylene glycols are sometimes referred to as polyethers, and as glycol polymers; they are characterized by having numerous ether linkages and two terminal hydroxyl groups. They are obtainable by procedures such as are disclosed in U.S. Patents 1,921,378, 1,976,678, and 2,425,845.

The polyoxyethylene glycols, sometimes designated "polyethylene glycols" and polyethylene ether glycols, may be defined by the formula:

$$HOCH_2(CH_2OCH_2)_nCH_2OH$$

The molecular weight may range from 200 to 6000, preferably 500 to 1500.

The polyoxypropylene glycols may be represented by the formula $HOCH(CH_3)CH_2O[CH_2CH(CH_3)O]_nH$. The molecular weight may be up to about 15000, preferably in the range of 750 to 4000. They are also designated "polypropylene glycols" and as polypropylene ether glycols.

The polyoxyalkylene glycols, also termed "polyalkylene glycols" and polyalkylene ether glycols, have an average molecular weight of up to about 15,000, but the preferred molecular weight range is 750 to 4000. These materials contain recurring oxyalkylene groups, preferably both oxyethylene and oxypropylene groups.

Note that polyesters are also obtainable by esterifying the polyoxyethylene, polyoxypropylene, or polyoxyalkylene glycols.

The alkylene glycols may be any of the simple glycols noted above.

As may be evident, the foregoing polyfunctional compounds may be embraced by the expression: polyols and ester derivatives thereof.

Other polyethers are polyoxybutylene glycol and polyepichlorohydrin. Still others are polythioethers, which are materials similar to the polyoxyethylene glycols, polyoxypropylene glycols, etc. except that a sulfur atom replaces the oxygen atom in the oxyethylene, oxypropylene, etc. group.

Other polyfunctional compounds include castor oil and drying oils.

The preferred polyfunctional compounds are the polyesters and polyethers, either linear or branched, having a molecular weight in the range of 700 to 5000 and modified to have 2 to 10 reactive end groups per molecule. Specific examples of polyesters are polyethylene adipates, polyethylene sebacates, polydiethylene adipates, polypropylene adipates, polyneopentyl adipates, etc. Specific examples of polyethers are polyethylene ether glycol, polypropylene ether glycol, polyethylene thioether glycol, polybutylene ether glycol, polyepichlorohydrin; also intermolecular and intra-molecular mixtures thereof; and polyfunctional hydroxyl-terminated adducts of diamines and polyols with these polyethers.

The organic polyisocyanates include ethylene diisocyanate; ethylidene diisocyanate; propylene-1,2-diisocyanate; butylene-1,3-diisocyanate; hexylene-1,6-diisocyanate; cycloxylene-1,2-diisocyanate; m-phenylene diisocyanate; 2,4-tolylene diisocyanate; 2,6-tolylene diisocyanate; toluene triisocyanate; 3,3'-dimethyl-4,4'-biphenylene diisocyanate; 3,3'-di-methoxy-4,4'biphenylene diisocyanate; 3,3'-diphenyl-4,4'-biphenylene diisocyanate; 4,4'-biphenylene diisocyanate; 3,3'-dichloro-4,4'-biphenylene diisocyanate; triphenylmethane triisocyanate; 1,5-naphthalene diisocyanate; diphenyl ether triisocyanate; polyphenyl ether polyisocyanate; etc. Polyisothiocyanates also can be used with success.

The catalyst is one that influences the reaction leading to the formation of foamed polyurethane plastic and usually comprises one or more tertiary amines like N-alkylmorpholine and N,N-dialkylcyclohexylamine where the alkyl groups are methyl, ethyl, propyl, butyl and the like; also triethylamine, tripropylamine, tributylamine, triamylamine, pyridine, quinoline, dimethylpiperazine, dimethylhexahydroaniline, diethylhexahydroaniline, reaction products of N,N'-diethylaminoethanol and phenylisocyanate. Also ester amines, dimethylbenzylamine, dimethyllaurylamine, dimethylstearylamine, etc. The preferred catalysts are those which are soluble in water.

In the operation of the method, the aqueous catalyst mixture may be prepared by mixing 50% to 90% by weight of water and 10% to 50% by weight of a catalyst. Small amounts of one or more emulsifying agents may be added to the latter in cases where the catalyst is not soluble or readily dispersible in water. As is apparent, the resulting mixture is a solution or a dispersion or emulsion. The emulsifying agent chosen will be conventional for the catalyst. When a polyester resin is used for preparing the prepolymer, any conventional water-in-oil emulsifier is suitable, some specific examples of which are polyoxyethylated vegetable oils and acids; mono esters of polyethylene glycol such as polyethylene glycol 600 mono laurate; and blends of polyalcohol carboxylic acid esters and alkyl aryl sulfonates. When polyethers are used for the prepolymer, the preferred emulsifiers comprise organosilicon polymer oils. The scrap or waste foam is shredded in any suitable way to a desired size, say particles whose longest dimension is about 1/16 to 1 inch, after which it is wetted with a minor amount of the catalyst-water mixture. Preferably, 100 parts by weight of the shredded foam are mixed with 2 to 20 parts by weight of the water-catalyst solution or dispersion. The liquid prepolymer, prepared as described above, is then taken; it may be used per se, or if the prepolymer as made does not contain sufficient free isocyanato end groups to give good bonding, a mixture may be made by adding to 100 parts by weight of prepolymer up to 30 parts by weight of an organic polyisocyanate. If desired, the uniformity of bonding can be improved by adding 0.1 to 1.5 parts by weight of an organosilicon polymer oil having a viscosity of 25 to 100 centistokes at 25° C. If additional softness of product and faster recovery from indentation are required, up to 30 parts by weight of any conventional plasticizer which is inert to isocyanate may be mixed into the prepolymer. The addition of organic polyisocyanate is to increase the number of free isocyanato groups available to react with the water and thus cause generation of a larger volume of bonding foam and greater pressure to fill better the interstices of the shredded mass. Suitable plasticizers are bis esters of dibasic acids, chlorinated paraffins, blocked alkylene ether glycols, and others. Some specific plasticizers are didecyl adipate, diisodecyl adipate, didecyl phthalate, dioctyl sebacate, etc.

The shredded foam-catalyst-water mixture is next mixed with a minor amount of the prepolymer mixture, preferably 10 to 60 parts by weight of the latter per 100 parts by weight of shredded foam. The resulting composition, which may be designated a foamable, or reactable, or moldable composition, may be foamed in situ or transferred to any desired vessel, tray, pan, mold or the like, either open or closed, to be foamed. It may also be placed between a pair of moving belts where a continuous slab of bonded foam product can be made. The foaming reaction is suitably carried out by heating the composition for several minutes at a suitable temperature, say 30 to 155° C., to effect the bonding. The process can be operated batchwise or continuously. During the heating of the composition, the water and catalyst vaporize, cause the prepolymer to foam, and thus bond the scrap particles to each other. The foaming is caused by the well known reaction of water with isocyanate which liberates carbon dioxide, causes the prepolymer to chain extend into much higher molecular weights, and to cross link into a three-dimensional network.

It is to be understood that the terms moldable, molding, mold, etc., as used herein, include the use of the other bonded product-shaping devices, noted above, besides conventional molds.

The method is characterized by the fact that the water-catalyst mixture is absorbed by every particle of shredded foam and at ordinary temperatures is held unavailable to react at any appreciable rate with the prepolymer, which is mixed in and forms a coating around a major portion of each particle. In contrast, if the water-catalyst mixture were not absorbed as described, but mixed per se directly with the prepolymer, reaction and foaming would begin about twenty seconds or so after mixing. However, by absorbing the water-catalyst mixture on and in the shredded foam, sufficient time is provided for pouring, shaping, and molding.

Another advantage is that by foaming the prepolymer under pressure from the generated carbon dioxide, it is caused to enter into and around the surface open cells of open celled foam, the bonding being accomplished by having the bonding medium send out continuous branches into the open celled interconnecting structure of the shredded particles. Although a chemical reaction between the foam particles and the prepolymer is possible, the bonding action is primarily a physical or mechanical one, and it results in maintaining the structure of the comparatively fragile cellular material or particles. It will thus be apparent that the process will bond foams to which adhesion by the prepolymer is not necessary, although good adhesion will, of course, be advantageous when it does occur. In the case of closed cells foams, adhesion by the prepolymer is necessary. The pressure due to the generation of carbon dioxide helps effect good contact and, therefore, better adhesion.

The invention may be illustrated by the following examples.

EXAMPLE I

A bonding prepolymer is prepared as follows: To 75 parts by weight of poly 1,2-propylene ether glycol, having a molecular weight of 2,000, there is added 25 parts of Tetronic 701, comprising a tetrafunctional hydroxyl-terminated adduct of ethylendiamine and propylene and ethylene oxides having a molecular weight of 2,700. These are mixed and then there are added 11 parts by weight of toluene diisocyanate, comprising a mixture of 80% of toluene 2,4-diisocyanate and 20% of toluene 2,6-diisocyanate. The subsequent mixture is heated for one hour at 80° C. There is then added 12 parts by weight of the same mixture of toluene diisocyanate isomers and the subsequent mixture is heated for another hour at 80° C. This mixture is then cooled to room temperature and there is added to it 12 parts by weight of the same mixture of toluene diisocyanate isomers and 1.0 part by weight of polydimethylsiloxane oil having a viscosity of 50 centistokes at 25° C., and the resulting material is mixed until homogeneous. A water-catalyst solution is prepared by dissolving in 100 parts by weight of distilled or deionized water 24 parts by weight of N-methylmorpholine. Scrap polyurethane foam is prepared for bonding by shredding to a particle size of $\frac{1}{16}$ to 1 inch. One hundred parts by weight of this shredded scrap is put into the mixing bowl of a Hobart mixer and to this is added, while mixing, 6.2 parts by weight of the above water-catalyst solution using a one minute addition time and mixing is continued for two minutes. Next there are added 25 parts by weight of the above prepolymer material, while mixing, using a one minute addition time and the mixing is continued for an additional two minutes. The mixed composition is then poured into and arranged evenly in a mold, and a lid is put on the mold and clamped. The filled mold is then heated for 5 to 20 minutes at 240–250° F. The mold then is opened and the bonded product removed. The product is continuous, well bonded and possesses a good cushioning feel.

EXAMPLE II

Example I was repeated except that 150 parts by weight of shredded foam rubber were used in place of the scrap polyurethane foam. The product is continuous, well bonded and has a resilient feel comparable to foam rubber.

EXAMPLE III

Example I was repeated except that to the prepolymer material there was added, and mixed therein, a chlorinated paraffin, designated Chlorowax LV, in an amount equal to 20% by weight of the prepolymer material. This addition was made prior to adding the prepolymer material to the scrap-catalyst-water mixture. The product is continuous, well bonded and has a softer feel than that of Example I.

EXAMPLE IV

A bonding prepolymer is prepared by mixing with 100 parts by weight of a poly-diethylene glycol adipate, having a molecular weight of approximately 2,200 and modified with trimethylol propane to have approximately an average of 2.5 hydroxyl end groups per molecule (i.e. every other molecule is trifunctional), 30 parts by weight of toluene diisocyanate isomers mixed in the ratio of 80/20 parts by weight of 2,4 to 2,6, and one part by weight of a polyoxyethylated vegetable oil emulsifier designated Emulphor EL–719. The resulting mixture was stirred until homogeneous. This mixture gets hot due to heat of reaction and is allowed to cool down to room temperature. A water-catalyst mixture is prepared by dissolving in 100 parts by weight of distilled or deionized water 12 parts by weight of N-methylmorpholine. One hundred parts by weight of shredded polyester urethane foam are put in the bowl of a Hobart mixer of convenient size and there are added 5.5 parts of the water-catalyst solution while stirring over a period of one minute and then mixing is continued for two minutes. There are then added 25 parts of the bonding resin while mixing over a period of one minute and mixing is continued for a period of two minutes. The mixed shredded foam compound is then poured into and arranged evenly in a mold of desired shape. A lid is put on the mold and clamped. The filled mold is then heated for 15 to 30 minutes at 240–250° F. It is then opened and the bonded product demolded. The product is continuous, well bonded and has a firm flexible feel. The amount of material put into the mold is gauged by the firmness desired in the finished product.

Products of firmer feels are obtainable by pouring more moldable composition into the mold and compressing the same. Densities of 2.8 to 10 lbs. per cu. ft. are well within the practical range.

It has been found that flexible polyurethane foams having shredded scrap or waste foam bonded therein in the manner described exhibit very good stress-strain and fatigue properties. Stress-strain curves, in which load in grams per sq. in. is plotted against compression in percent showed that products of the present method, having a density of 3.5 lbs. per cu. ft., produced curves of continually increasing slope which are characteristic of and indistinguishable from those of foam rubber of a density of 5.4 lbs. per cu. ft., and those of virgin polyether urethane foams of a density of 2.3 lbs. per cu. ft. The curves are generally regarded as indicative of very desirable seating quality.

In another test, products of the present method in the form of two-inch thick slabs, were indented by a 50-sq. in. circular foot (substantially smaller than the slabs) to produce indentations of 25% and 50% of the original height of the slabs. The indentation or compression load in lbs. per 50 sq. in. was plotted against the density in lbs. per cu. ft. of the product. For the 25% indentation, the load varied from 14 to 96 as the density varied from 3.0 to 7.4. For the 50% indentation the load varied from 41 to 114 as the density varied from 3.0 to 6.25. It is evident that any firmness of product can be obtained simply by varying the amount of scrap put into each unit volume of a mold or continuous slab. The indentation strengths are comparable to those of two-inch thick foam rubber slabs having a density range of 4 to 12 lbs. per cu. ft. and virgin polyurethane foam slabs having a density range of 1.8 to 6 lbs. per cu. ft.

In a further test, a two-inch thick desk chair cushion made from a scrap-containing polyether urethane foam by the instant method was flexed by compressing it to a one-inch height 250,000 times at the rate of one flex per second. Fatigue data on unflexed and flexed cushions were obtained and are shown in Table I. The losses shown in the column headed "percent change" are no greater than those for virgin urethane or rubber foams.

*Table I*

| Property | Before Flexing | After Flexing 250,000 Cycles | Percent Change |
|---|---|---|---|
| RMA Compression Load at 25% Deformation (Lbs./50 sq. in.) | 20.7 | 16.2 | −21.7 |
| RMA Compression Load at 50% Deformation (Lbs./50 sq. in.) | 49.7 | 52.3 | +5.1 |
| Height, in | 2.01 | 1.92 | −4.5 |
| Compression Set (By ASTM Method A) Percent of Original Height | 10.9 | 10.8 | 0 |

In the light of the foregoing description, the following is claimed:

1. Method of preparing a composition comprising a shredded expanded cellular polymeric material and of molding the composition which comprises adding 2 to 20 parts by weight of a water-catalyst mixture to 100 parts by weight of said shredded material, said mixture comprising 50 to 90% by weight of water and the balance catalyst, said shredded material having a particle size of 1/16 to 1 inch and the particles thereof absorbing said water-catalyst mixture, said catalyst influencing the reaction between water and isocyanate to form a foamed urethane polymer; thereafter mixing 10 to 60 parts by weight of a prepolymer material with said shredded material-water-catalyst mixture to form a moldable composition, said prepolymer material comprising a liquid prepolymer formed by reacting a polyfunctional reactive hydrogen compound with an organic polyisocyanate, said polyfunctional compound being terminated by reactive hydrogen-containing groups which react with isocyanato groups to form a polyurethane, said polyisocyanate being present in an amount sufficient to provide at least 1.05 isocyanato groups per each said terminal group of said poly-functional compound, said prepolymer having a free isocyanate content of 1 to 15% by weight and free isocyanato end groups; said prepolymer in said moldable composition forming a coating around at least a major portion of said particles of shredded material, the water and catalyst content of said moldable composition being held unavailable for reaction at any appreciable rate at room temperatures with said prepolymer owing to said absorption thereof by said particles; placing said composition in a mold, heating said mold to hasten said reaction, and recovering from the mold a foamed urethane polymer having said shredded material incorporated therein and bonded thereto.

2. Method of claim 1 wherein said prepolymer material comprises a mixture of 100 parts by weight of said liquid prepolymer, up to 30 parts by weight of an organic polyisocyanate, 0.10 to 1.5 parts by weight of an organosilicon polymer oil having a viscosity of 25 to 100 centistokes at 25° C., and up to 30 parts by weight of a plasticizer for said liquid prepolymer which is inert to the isocyanato group.

3. Method of preparing a composition comprising shredded expanded cellular polymeric material and of molding the composition which comprises adding a minor amount of a water-catalyst mixture to a major amount of said shredded material, said material absorbing said water-catalyst mixture, said catalyst influencing the reaction between water and isocyanate to form a foamed urethane polymer; thereafter mixing a minor amount of a prepolymer material with said shredded material-water-catalyst mixture to form a foamable composition, said prepolymer material comprising a liquid prepolymer formed by reacting a polyfunctional reactive hydrogen compound with an organic polyisocyanate, said polyfunctional compound being terminated by reactive hydrogen-containing groups which react with isocyanato groups to form a polyurethane, the amount of said polyisocyanate being sufficient to provide at least 1.05 isocyanato groups per each said terminal group of said polyfunctional compound, said prepolymer having a free isocyanate content of 1 to 15% by weight and free isocyanato end groups; the water and catalyst content of said composition being held unavailable for reaction at any appreciable rate at room temperatures with said prepolymer owing to said absorption thereof by said shredded material; heating said composition, and recovering a foamed urethane polymer having said shredded material incorporated therein and bonded thereto.

4. Method of preparing a composition comprising shredded expanded cellular polymeric material and of molding the composition which comprises adding a liquid prepolymer to a mixture comprising water, catalyst, and said shredded material with said water and said catalyst absorbed into said shredded material to form a foamable composition, said liquid prepolymer being formed by reacting a polyfunctional reactive hydrogen-containing compound with an organic polyisocyanate, said polyfunctional compound being terminated by reactive hydrogen-containing groups which react with isocyanate to form a polyurethane, said prepolymer having free isocyanato end groups, said catalyst influencing the reaction between said free isocyanato groups of the prepolymer and said water to form a foamed urethane polymer, carrying out said last-mentioned reaction, and recovering a foamed urethane polymer having said shredded material incorporated therein and bonded thereto.

5. A method as defined in claim 4, wherein the shredded cellular polymeric material is foamed polyurethane.

6. A method of preparing a composition comprising a particulate expanded cellular rubbery material which comprises adding a liquid polyurethane prepolymer having free isocyanato end groups to a mixture comprising water, catalyst and said particulate material with said water and said catalyst absorbed into said particulate material to form a foamable composition; said prepolymer being the reaction product of an organic polyisocyanate and a polyfunctional reactive hydrogen containing compound containing reactive hydrogen groups which react with isocyanato groups to form a polyurethane; and heating said composition sufficiently to form a foamed polyurethane polymer having said particulate material incorporated therein and bonded thereto.

References Cited in the file of this patent

UNITED STATES PATENTS

| | | |
|---|---|---|
| 2,842,506 | Roussel | July 8, 1958 |
| 2,892,216 | Steel | June 30, 1959 |
| 2,894,919 | Simon et al. | July 14, 1959 |
| 2,901,445 | Harris | Aug. 25, 1959 |

OTHER REFERENCES

German printed application (Stastny), Serial No. B29206, printed March 8, 1956.